No. 685,502. Patented Oct. 29, 1901.
T. AINSWORTH.
ANIMAL TRAP.
(Application filed Jan. 3, 1900.)
(No Model.)
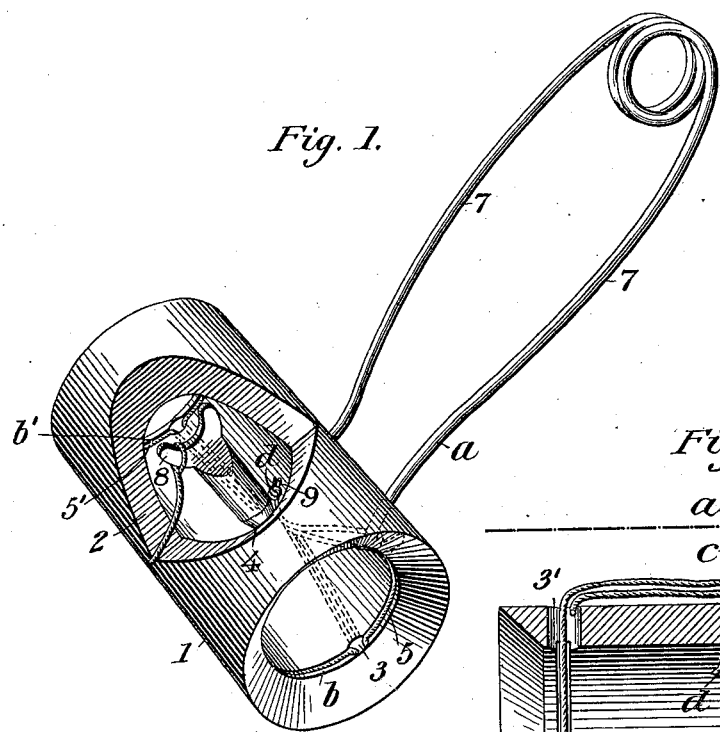
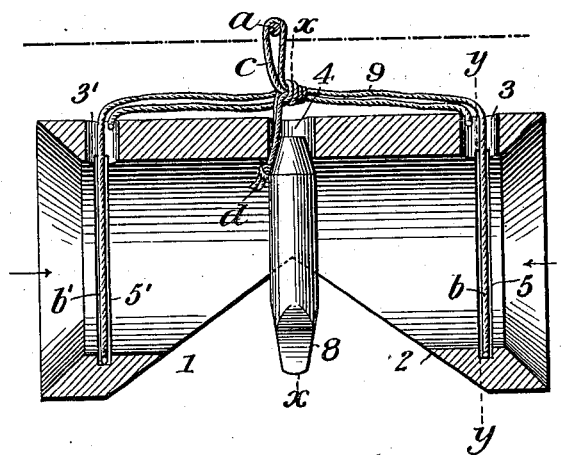
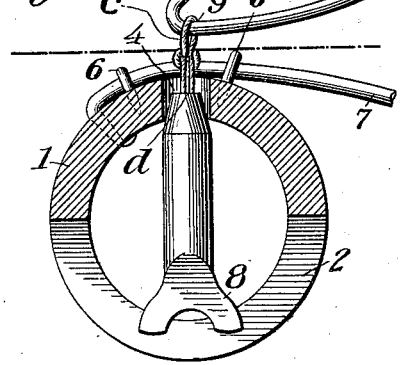
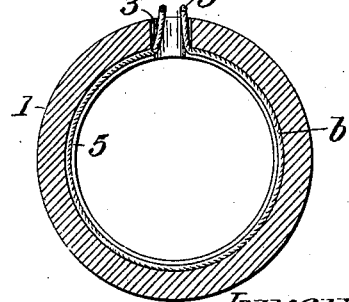
Witnesses,
M. W. Kincaid.
Eliz. Kincaid.
Inventor,
Thomas Ainsworth
by Kincaid & Co.
his Attys.

UNITED STATES PATENT OFFICE.

THOMAS AINSWORTH, OF PLEASANTON, CALIFORNIA.

ANIMAL-TRAP.

SPECIFICATION forming part of Letters Patent No. 685,502, dated October 29, 1901.

Application filed January 3, 1900. Serial No. 273. (No model.)

*To all whom it may concern:*

Be it known that I, THOMAS AINSWORTH, a citizen of the United States, residing at Pleasanton, in the county of Alameda and State of California, have invented certain new and useful Improvements in Animal-Traps; and I do hereby declare the following to be a full, clear, and exact description of the invention, such as will enable others skilled in the art to which it appertains to make and use the same.

My present invention relates to that class of devices known generally in the art as "animal-traps," which are provided for the capture and extermination of such animals as gophers, moles, squirrels, and the like.

This invention has for its object to produce a trap which will possess the requisites of strength and durability and which will be especially simple in construction and efficient in operation.

In the employment of my invention it is not necessary to handle or carefully inspect the hidden trap to ascertain if the same has been sprung, as the parts are so arranged that the distance the spring appears above the ground indicates the condition of the trap.

My invention more particularly resides in the novel combination, construction, and arrangement of parts, all as more fully hereinafter described, and set forth in the claims.

In carrying out my invention I have not overlooked the matter of structural economy and simplicity.

I am enabled to accomplish the above results by the means illustrated in the accompanying drawings, in which—

Figure 1 is a perspective view of the trap, the parts being set ready for operation. Fig. 2 is a central longitudinal section of device. Fig. 3 is a section taken on the line $x$ $x$ of Fig. 2, and Fig. 4 is a similar view taken on the line $y$ $y$ of Fig. 2.

I will now set forth the general construction of the trap and subsequently explain the operation of the same, reference being had to the above views by reference characters.

The main body of the trap consists of a hollow cylindrical member 1, whose interior walls diverge toward the extremities of the central bore, thereby forming funnel-shaped opposite mouths. This cylindrical member 1 has its wall notched or cut out to form the opening 2, while penetrating the opposite side of the cylinder and near the extremities thereof are the small perforations 3 3'. Midway between these perforations 3 3' and in a line therewith is the central hole 4, while intersecting the perforations 3 3' and entirely encircling the interior of the member 1 are the grooves 5 5'.

Extending approximately at right angles from the member 1 and rigidly secured thereto by means of a clenched end and staples 6 is one leg of the spring 7, which after coiling to render it sufficiently resilient terminates in the free leg $a$.

The only other elements of the device that I have not mentioned are the forked plug 8, which engages with the hole 4, and the looped string 9, the latter being knotted to form the loops $b$, $b'$, $c$, and $d$, the latter having a knot at its extremity.

Having thus gone into the general construction of the device, I will now explain the operation of the same.

In order to set the trap, the loops $b$ $b'$ are inserted in the perforations 3 3' and then pressed into the grooves 5 5' in the manner shown in Fig. 4, where they are retained by pressing loose soil about the grooves. The knotted end $d$ is then threaded through the hole 4, where it is held by the engagement of the plug 8, as shown in Fig. 2, while the free end $a$ of the spring 7 is forced toward member 1 and hooked into loop $c$. Now, assuming that the trap is buried in the ground to a depth indicated by the broken lines in Figs. 2 and 3 and in a line with the run or burrow of the animal, it will be readily seen that should the animal endeavor to pass through the hollow member 1 in either direction, as indicated by the arrows in Fig. 2, the plug 8 will be thrown over and out of engagement with the hole 4, which operation releases the free end $a$ of the spring, which flies upward and carries with it the cord 9. Now one of the loops $b$ or $b'$, which is at the opposite extremity of the member 1 from which the animal enters, is free to be drawn out of the perforation, while the other loop, which at this moment encircles the animal, will be drawn upward, thereby confining and strangling the prey.

It is manifest that the attendant can readily detect whether the trap has been sprung by merely observing the distance the leg $a$ projects above the ground, for should the trap still be in a set condition the leg $a$ will just be visible above the surface of the ground, as shown in Figs. 2 and 3.

The construction and arrangement of the several parts of my trap being thus made known, the operation and advantages of the same will, it is thought, be readily understood.

I am aware that changes in the form and proportion of parts of the devices herein shown as embodiment of my invention can be made without departing from the spirit or sacrificing the advantages thereof, and I therefore reserve the right to make such changes, substitutions, and alterations as fairly fall within the scope of my invention.

Having thus fully described my invention, what I claim, and desire to secure by Letters Patent, is—

1. In an article of the class described, the combination with a hollow member, a spring secured to said member, a string or cord knotted to form a plurality of arms one or more of which are intended to be looped within said member, a plug adapted to engage with said member and hold said cord against the tension of said spring, the disengagement of said plug permitting said spring to draw said loops from said member, substantially as set forth.

2. In combination with a hollow cylindrical body, a spring secured to said body, one or more encircling grooves in said body, a cord knotted to form a plurality of arms, a plug within said member and adapted to hold said cord against the tension of said spring, one or more of said arms being intended for engagement with said grooves, the disengagement of said plug permitting said spring to draw said loops from said member, substantially as set forth.

3. In combination with a hollow cylindrical body having a plurality of perforations in its walls, a plug adapted to removably engage one of said perforations, a spring having one leg secured to said member, and a cord held in place by said plug and engaging with said spring, and one or more encircling grooves within said member for the reception of said cord, all arranged to operate as set forth.

4. In combination with a hollow cylindrical body having a plurality of perforations in its walls, a spring secured to said member, a plug engaging with said member, a cord held in place by said plug and engaging said spring, and means for holding said cord about the mouth of said member, for the purpose set forth.

In testimony whereof I affix my signature in presence of two witnesses.

THOMAS AINSWORTH.

Witnesses:
WILLIAM G. CROW,
WALTER THOMPSON.